United States Patent
Sale (10) Patent No.: US 8,681,267 B2
(45) Date of Patent: Mar. 25, 2014

(54) LENS CAP WITH STORAGE DEVICE

(76) Inventor: James Edward Sale, Redmond, OR (US)

( * ) Notice: Subject to any disclaimer, the term of this patent is extended or adjusted under 35 U.S.C. 154(b) by 0 days.

(21) Appl. No.: 13/441,916

(22) Filed: Apr. 9, 2012

(65) Prior Publication Data

US 2013/0044252 A1 Feb. 21, 2013

Related U.S. Application Data

(60) Provisional application No. 61/525,814, filed on Aug. 21, 2011.

(51) Int. Cl.
*H04N 5/225* (2006.01)

(52) U.S. Cl.
USPC ............................. 348/373; 345/375; 345/335

(58) Field of Classification Search
USPC .................. 348/373, 375, 231.7, 231.8, 335; 396/448
See application file for complete search history.

(56) References Cited

U.S. PATENT DOCUMENTS

| | | | | |
|---|---|---|---|---|
| 5,162,942 A | * | 11/1992 | Anzai et al. | 359/511 |
| 5,242,049 A | * | 9/1993 | Mizuno et al. | 206/308.3 |
| 7,997,969 B1 | * | 8/2011 | Murrell et al. | 463/9 |
| 2009/0059064 A1 | * | 3/2009 | Terakado | 348/376 |

* cited by examiner

*Primary Examiner* — Twyler Haskins
*Assistant Examiner* — Padma Haliyur (57) ABSTRACT

A multi-purpose lens cap 10 which functions as a storage device and camera lens protector is disclosed. The lens cap 10 storage device provides a readily accessible place to store memory cards 20, pre-moistened lens cleaning wipes or other accessories that may be integral to the operation of a camera. Because the lens cap 10 is capable of storing these, and other accessories, efficiency and artistic freedom is achieved that wasn't previously possible. In the case of failure or loss, a memory card 20 can immediately be replaced from a reserve in the lens cap 10. Additionally, a pre-moistened wipe can be accessible from the lens cap 10 storage device, providing a way to safely and easily clean a lens while on location.

4 Claims, 6 Drawing Sheets

LENS CAP WITH STORAGE DEVICE

CROSS-REFERENCE TO RELATED APPLICATIONS

This application claims the benefit of provisional patent application Ser. No. 61/525,814, filed 2011 Aug. 21 by the present inventor.

BACKGROUND

Prior Art

The following is a tabulation of some prior art that presently appears relevant:

| U.S. patents | | | |
|---|---|---|---|
| Pat. No. | Kind Code | Issue Date | Patentee |
| 4,600,278 | | 1986 Jul. 15 | Saito |
| 7,717,630 | B1 | 2010 May 18 | Wan |

| U.S. patent Application Publications | | | |
|---|---|---|---|
| Publication Nr. | Kind Code | Publ. Date | Applicant |
| 0038269 | A1 | 2010 Feb. 18 | Picard |
| 0124954 | A1 | 2008 May 29 | Wei Chen |
| 0086101 | A1 | 2009 Apr. 02 | Lee |
| 0170854 | A1 | 2011 Jul. 04 | Tse, JR. |

| Foreign Patent Documents | | | |
|---|---|---|---|
| Foreign Doc. Nr. | Cntry Code | Kind Code Pub. Dt | App of Patentee |

BACKGROUND

This application relates to camera accessories, and more specifically, to a lens cap having a storage device.

BACKGROUND

Prior Art

Lens caps are a necessity for photographers to carry as a protection device for a camera lens. Without the use of a lens cap, the lens is at risk of permanent damage. A conventional lens cap, such as U.S. Pat. No. 4,600,278 to Saito (1986), provides protection features that keep a lens free from dirt, debris, dust and scratches. The prior art fails to reach its full potential because it provides only a single function. Because lens caps are the most common camera accessory and are readily available, it is desirable to have a lens cap that provides multiple functions.

An example of common storage devices for memory cards is Patent Application Publication No. 0038269 to Picard (2010). These storage devices provide photographers a place to store memory cards but fail when it comes to day to day accessibility. The reason they fail to be readily accessible is simple. Photographers progress to only the most essential elements required to complete a task. Many photographers own a staggering amount of photographic equipment. Some common accessories include: a flash, filters, additional lenses, reflectors, tripods, and any number of camera bags and storage devices. With the exception of professional photographers, this equipment is rarely used on a day to day basis. The reason is simply that there is far too much equipment to manage. Storage devices such as these are difficult to make readily available for day to day carry. Only the most essential photographic items accompany the photographer on a permanent basis.

Even the most common and compact memory card storage devices such as Patent Application Publication No. 0124954 (2008) to Wei Chen suffers from the problem that the invention disclosed is less likely to be carried while out in the field. When carried it would most likely be in a camera bag or pocket where it can easily be lost or misplaced.

U.S. Pat. No. 7,717,630 to Wan (2010) discloses a device for a camera cap with a white balance insert and Patent Application Publication 0086101 to Lee (2009) discloses a lens cap with a dual-purpose lens cap protector and white balance filter. Neither of these inventions provides a storage device. With the trend clearly towards memory miniaturization, there is a real need for a lens cap that provides storage.

Patent Publication 0170854 to Tse, J R. (2011) discloses a camera lens accessory holder for the storage of lens caps. The disclosed device does not however provide for a way to store accessories using the lens cap as a storage device itself.

What is needed and heretofore not provided is a lens cap that provides a plurality of functions, including a readily accessible storage device while providing the protection of a conventional lens cap.

SUMMARY

A lens cap with storage device is disclosed for use by photographers having the capability of storing by example and not limited to SD card(s), compact flash card, mini SD card(s), memory stick pro duo, micro SD card(s) or any other portable media card or device that is developed in the future. The lens cap will act and function in the same manner as a traditional lens cap while providing novel features. It provides the ability to store items on or within the body of a lens cap. By way of example and not limitation items that can be stored within the compartment of the lens cap include: memory cards, pre-moistened lens wipes, or anything else that aids the photographer providing it is of suitable size for storage. Other features include a decal onto which an owner's information can be written. Additional items can be specifically manufactured to fit within the storage space. They can include, for example, a small LED flashlight to assist with night photography. Items stowed in the lens cap are readily accessible providing a backup memory card to the photographer. The lens cap with storage can be made of one part or multiple parts with the storage being on either side of the lens cap. One embodiment would have a transparent insert that holds items to the interior of the lens cap; the interior being the side facing the front element of the camera lens when the cap is attached.

Any camera that utilizes a lens cap would be compatible with the lens cap of the present invention. The compatible cameras include still cameras, digital or film cameras, video cameras, and any other lens that requires a lens cap.

Advantages

Accordingly, several advantages of one or more aspects are as follows: to provide a convenient and readily accessible storage place on a lens cap. This further provides backup for items such as, by example and not limited to, memory cards. In case of malfunction, the photographer conveniently has a spare memory card located in the lens cap. In case of a full memory card or a forgotten memory card, one is readily available. Other advantages of one or more aspects will be apparent from a consideration of the drawings and ensuing descriptions.

DRAWINGS

Figures

The illustrations are shown by way of example, and not by way of limitation, in the figures of the accompanying drawings and in which.

| DRAWINGS-Reference Numerals | | | |
|---|---|---|---|
| 10 | Lens cap | 15 | A, B, C, D Female mount attachments |
| 17 | Decal (Owners Info) | 20 | Image storage device |
| 30 | Retainer | 31 | A, B, C Retainer side walls |
| 39 | A, B, C, D Male mount posts | 60 | Alternative Lens Cap |
| 70 | Overhead bar | 75 | Wedge |
| 80 | Lens cap with front cavity | | |

DETAILED DESCRIPTION

FIG. 1, FIG. 2, FIG. 3, FIG. 4 and FIG. 5

First Embodiment

Figure 1:
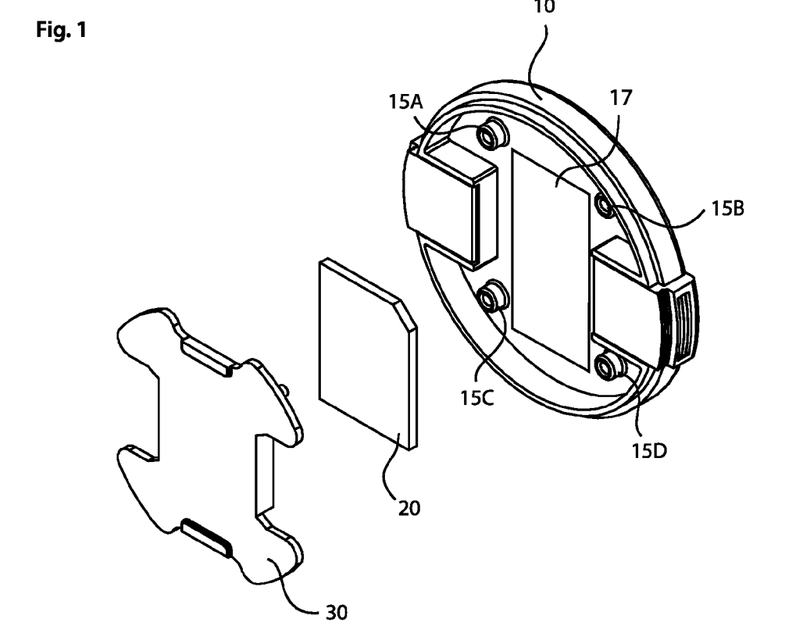
FIG. 1 illustrates the lens cap with storage device as seen from the inside view (the side that faces the lens of the camera) in accord with an embodiment of the invention having a releasably connected retainer capturing the image storage device between the lens cap and the retainer.
Figure 2:
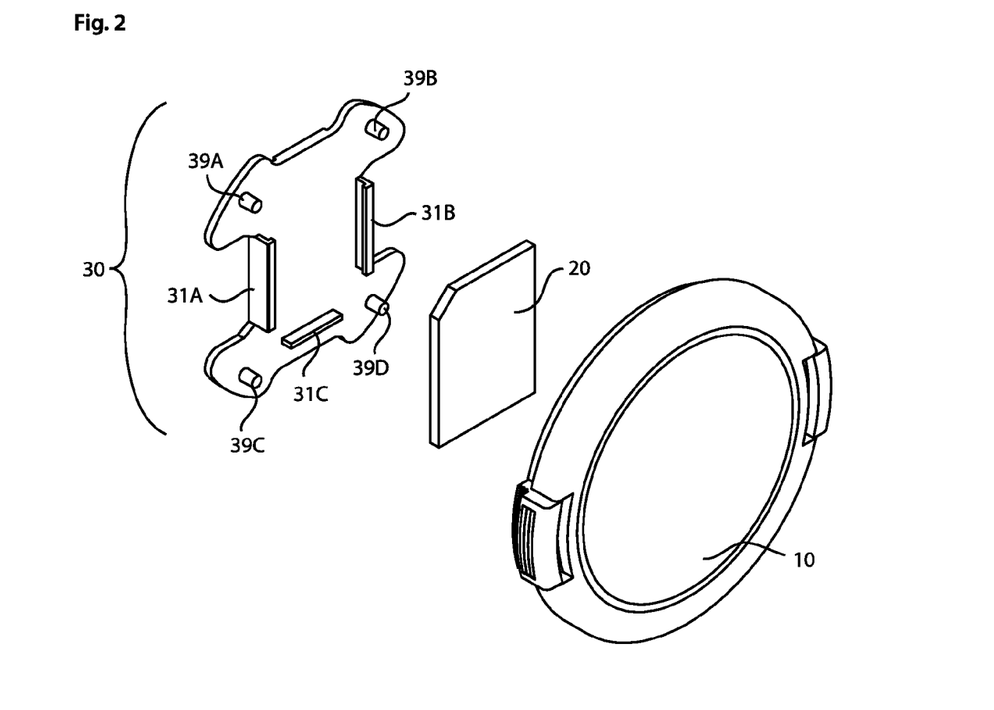
FIG. 2 shows an outside view of lens cap and releasably connected image storage device.

One embodiment of the lens cap with storage device is illustrated in FIG. 1 (inside view). The disclosed embodiment comprises a lens cap 10 body having a releasably connected retainer 30. The retainer 30 is capable of storing a memory card 20 of a known type that is captured between the lens cap 10 and the retainer 30 FIG. 2 (outside view). The retainer 30 has side walls 31A, 31B and 31C that contain the memory card 20 in the retainer 30. The retainer 30 with the memory card 20 is then releasably connected to the lens cap 10 by inserting the four male posts FIG. 2 39A, 39B, 39C, 39D into the female mount attachments FIG. 1 15A, 15B, 15C, 15D on the lens cap 10. The lens cap 10 provides adequate space to affix a decal 17 with camera owner's personal information.

Figure 3:
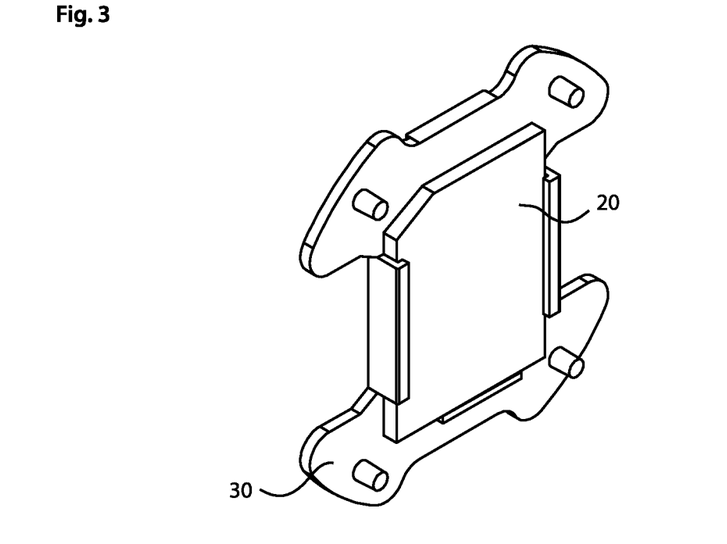
FIG. 3 shows a retainer holding the image storage device as it would appear when it is in position to be stored in the lens cap.
Figure 4:
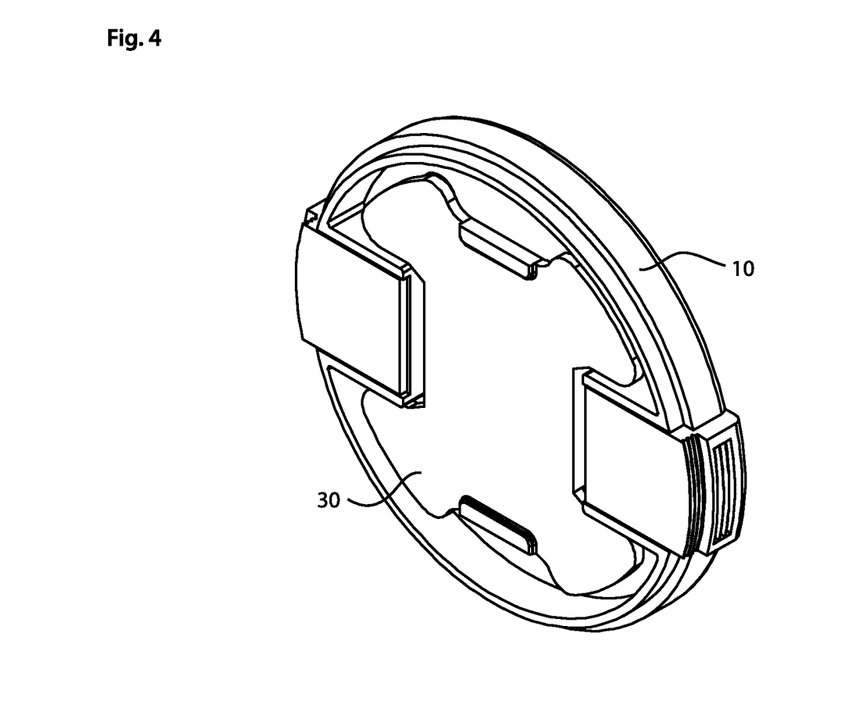
FIG. 4 shows the retainer connected to the inside of the lens cap with the image storage device captured between the lens cap and the retainer.

FIG. 3 shows a memory card 20 stored inside the retainer 30. FIG. 4 shows the retainer 30 attached to the lens cap 10 in its stowed position. The lens cap 10 with retainer 30 and stowed memory card 20 is ready to be mounted to the lens of a camera to provide protection to the lens surface while storing a memory card 20 inside the enclosed space. In some embodiments the retainer 30 can be semi transparent allowing the photographer to visually check that the memory card 20 is stored in the lens cap 10 without removing the retainer 30.

The various parts of the lens cap 10, 15 A,B,C,D, 30, 31 A, B,C, 39 A,B,C, and D can be molded using injection molding processes that are well known in the industry; or the various parts can be manufactured by any processes that are well known in industry, or they can be made by any process appropriate for the product. The lens cap 10, often made of plastic or the like, may be made of multiple molded parts and assembled after the molding process.

Operation—FIGS. 5a, 5b, 5c, 5d and 6a, 6b

In operation, a lens cap with storage device will be easily adapted by photographers. Lens caps are unique to camera accessories because, unlike other accessories, they almost always accompany or are operatively connected to the camera.

There are real world operational advantages with a lens cap having the ability to store additional memory cards in an unobtrusive and inconspicuous place. In particular, an embodiment having a storage device on the inside of the lens cap (in an inoperative location between the lens and the lens cap) is an ideal place for the photographer to store additional memory cards or other small accessories because it does not affect the operation, aesthetics or ergonomics of the camera. Aesthetics and ergonomics can be easily overlooked even though they are extremely important considerations when discussing the operation of a new device.

Figure 5A:
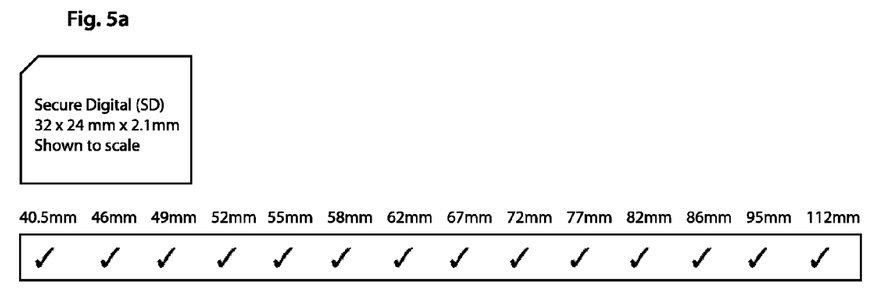
FIG. 5a shows a size chart with the corresponding sizes of lens caps that I currently feel will best fit the various embodiments of a lens cap with storage device using a SD card on the outside of the lens cap.
Figure 5B:
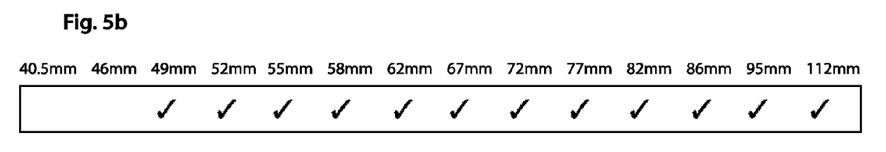
FIG. 5b shows a size chart with the corresponding sizes of lens caps that I currently feel will best fit the various embodiments of a lens cap with storage device using a SD card on the inside of the lens cap.
Figure 5C:
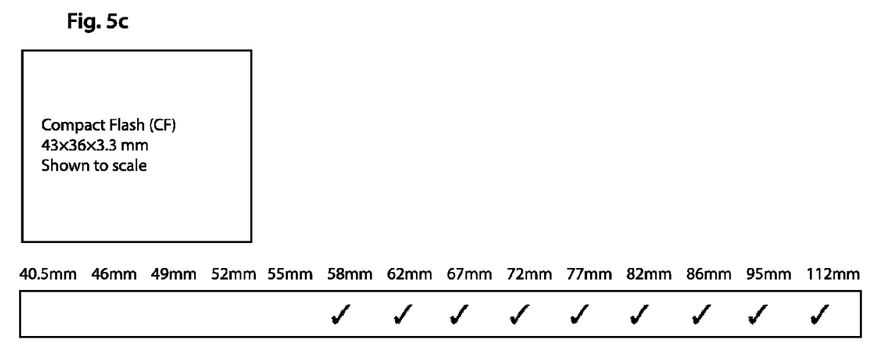
FIG. 5c shows a size chart for a lens cap with an embodiment and storage device for CF card type stored on the outside on the lens cap
Figure 5D:
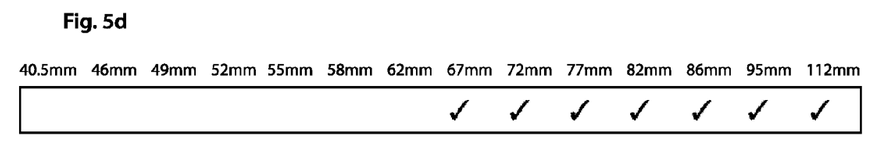
FIG. 5d shows a size chart for a lens cap with an embodiment and storage device for CF card type stored on the inside of the lens cap

Lens caps come in many sizes but some common sizes include 30.5 mm, 37 mm, 40.5, 43 mm, 46 mm, 49 mm, 52 mm, 55 mm, 58 mm, 62 mm, 67 mm, 72 mm, 77 mm, 82 mm, 86 mm, 95 mm, 112 mm and 127 mm. A large selection of memory cards or image storage devices are available and currently include SD cards, compact flash cards, mini SD cards, memory stick pro duo cards and micro SD cards. Continually, new image storage devices are being developed. The trend continues to be image storage devices that are smaller form factors with more storage capacity. Shown by example and not limitation, FIGS. 5a, 5b, 5c and 5d shows the two most common card types 20 and the corresponding sizes of lens caps 10 that I currently feel will best fit the various embodiments. FIG. 5a is a size chart for lens caps 10 with an embodiment and storage device for SD card types stored on the outside of a lens cap 10. FIG. 5b is a size chart for lens caps 10 with an embodiment for an SD card type stored with storage device on the inside of a lens cap 10. FIG. 5c is a size chart for a lens cap 10 with an embodiment and storage device for CF card type stored on the outside on the lens cap 10. FIG. 5d is a size chart for a lens cap 10 with an embodiment and storage device for CF card type stored on the inside of the lens cap 10.

The lens cap 10 operatively connects to a camera lens in the same manner as a traditional lens cap. The lens cap 10 provides protection to the camera lens from outside elements including dirt, dust, scratches, debris and light impacts.

In one embodiment, the lens cap 10 is detached from the camera lens before the retainer 30 on the interior of the lens cap 10 is accessible. The retainer 30 is then temporarily detached from the interior wall of the lens cap 10. See example FIG. 6a (shown by example and not limitation) a memory card 20 is inserted into the retainer 30. In one embodiment the retainer 30 has side walls 31 A, B, C holding the memory card 20 in place. When larger lens caps 10 are used a fourth upper wall in the retainer 30 may be required in order to hold the memory card 20 in place. In the example disclosed, the retainer 30 can be made of a semi-transparent plastic allowing the photographer to see through the retainer 30 to the defined open ended space between the lens cap 10, and the retainer 30. The retainer 30 is then attached to the lens cap 10 and the lens cap can now be operatively connected to the camera lens.

Because the memory card 20 that is stored in the lens cap 10 is identical in size and type to the memory card in use by the camera, a photographer can interchange the memory card 20 in the lens cap with the memory card that was used in the camera. The memory card 20 that was previously used in the camera can then be stored in the lens cap 10.

Figures 6A, 6B:
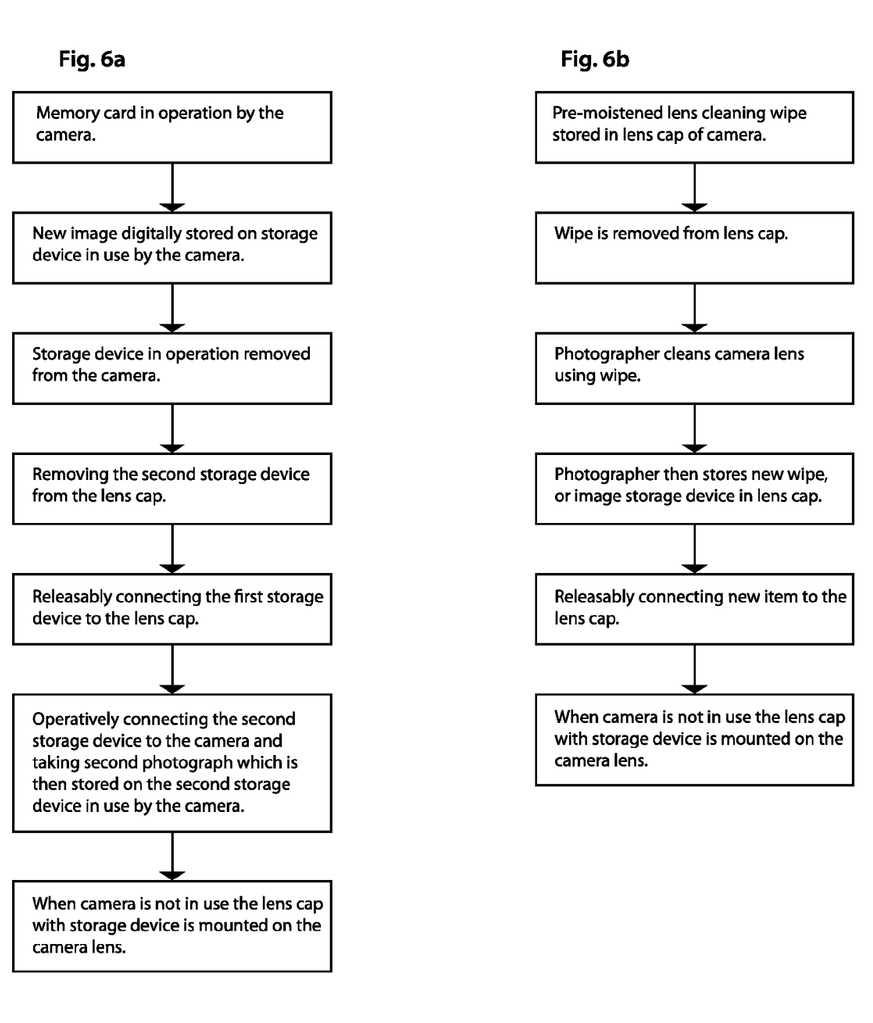
FIG. 6a shows the steps of using a memory card with a lens cap having storage.
FIG. 6b shows the steps of using a pre-moistened lens cleaning cloth with a lens cap having storage.

Another example of operation is shown in FIG. 6b showing the steps of using a lens cap 10 to store a conventional (not shown) pre-moistened lens cleaning wipe. These wipes are commonly available and come prepackaged in a single use wrapper. They are small, compact and ideally suited for storage in a lens cap. Many other items can be stored in a similar manner providing that the item to be stored is of appropriate size. Additionally, the photographer can write personal contact information on a decal 17 that can then be affixed to the inside wall of the lens cap 10 body.

Functionally, a goal of the operation of the lens cap 10 with storage device is to provide immediate accessibility to integral parts of the camera such as memory cards 20 while being unobtrusive to the photographer. It provides a solution in terms of being compact, convenient and essentially "idiot proof."

Various arrangements may be used on alternative embodiments to connect the memory card 20 to the lens cap 10, either directly or via an intermediate holder. Such arrangements include hook-and-loop type fasteners, adhesives (to permanently secure certain intermediate holders to the lens cap), spring clips, snaps, and other suitable conventional fasteners. Also, future memory cards and/or future lens caps may be manufactured to accommodate a direct mounting of the former onto the latter.

Figure 7A:
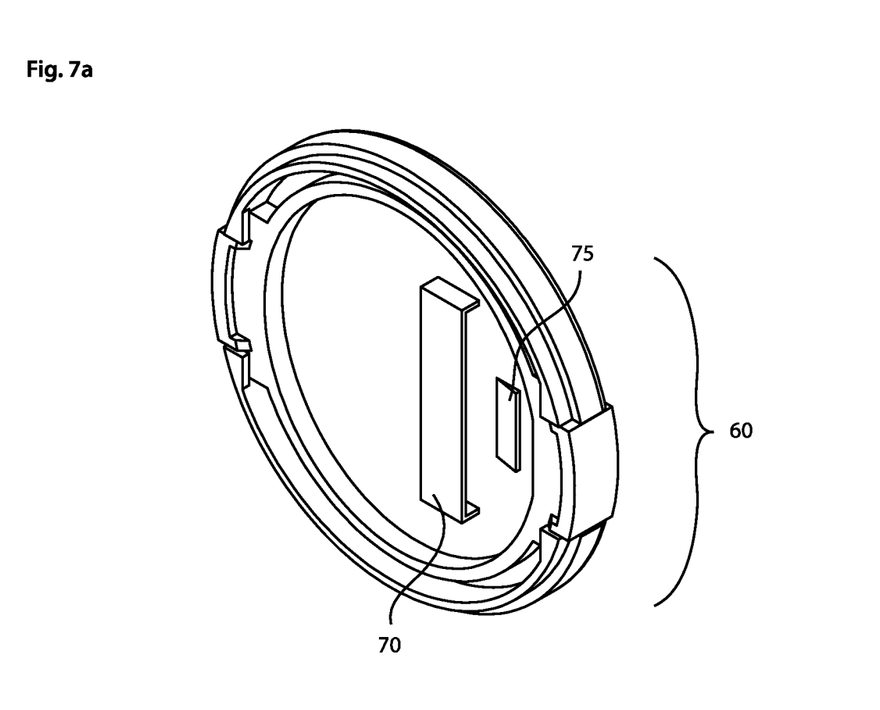
FIG. 7a shows an alternative embodiment of a lens cap with storage device; in this view, the memory card has been removed.
Figure 7B:
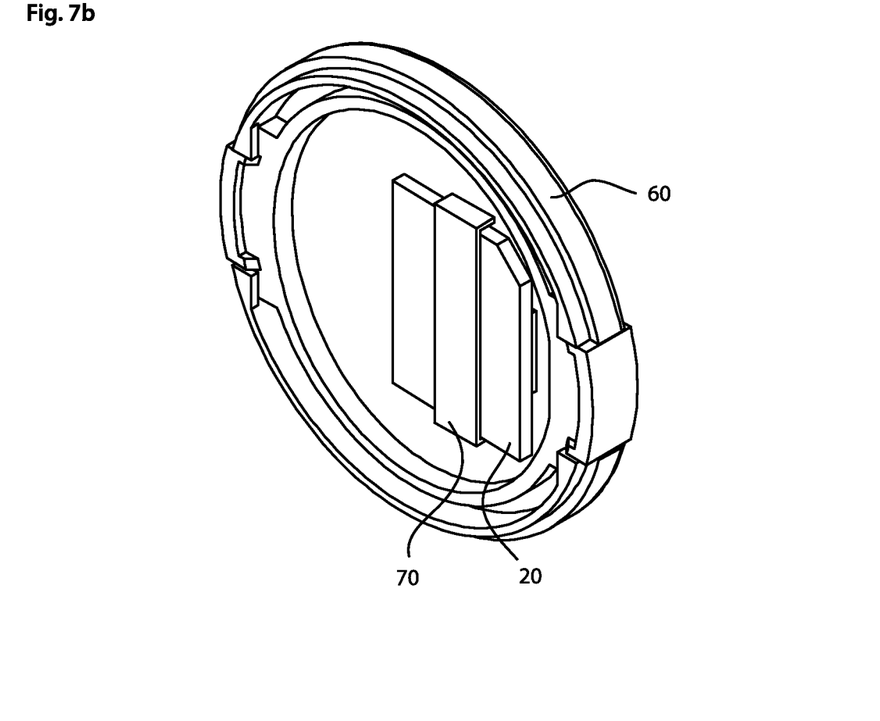
FIG. 7b shows how the alternative embodiment will appear with a memory card inserted.

FIGS. 7a-7b

Additional Embodiments

An additional embodiment is shown in FIGS. 7a and 7b. This embodiment is a alternative lens cap 60 with an overhead bar 70 and a wedge 75. In this embodiment the photographer slides a memory card 20 between the overhead bar 70 and above the wedge 75. The memory card is then sandwiched between the overhead bar 70 and the wedge 75. The item is removed from the cap by pulling on the memory card 20 in the opposite direction. This embodiment requires adequate room to enable the sliding motion of the memory card 20 within the body of the alternative lens cap 60; this may have disadvantages particularly with smaller lens caps.

Figure 8A:
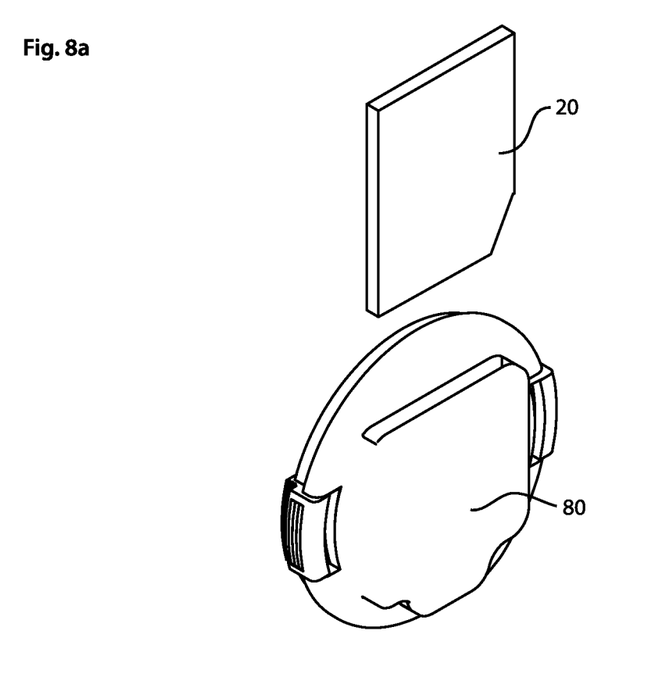
FIG. 8a shows an alternative embodiment of a lens cap with a front cavity for the storage of a memory card.
Figure 8B:
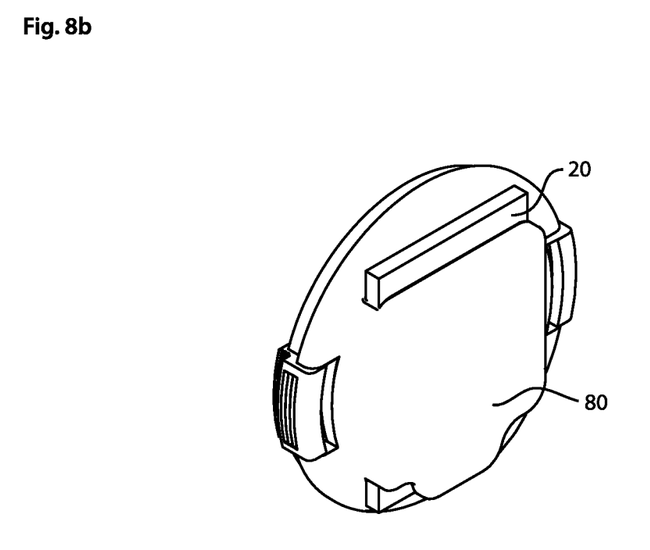
FIG. 8b shows the alternative lens cap with a front cavity storing a memory card on the lens cap.

FIGS. 8a-8b

Alternative Embodiments

An alternative embodiment is shown in FIGS. 8a and 8b. FIG. 8a shows a lens cap 80 with a cavity that stores a memory card 20 on the outside of the lens cap (The side of the cap that faces away from the lens of the camera). The lens cap 80 that is illustrated is very small, only 40.5 mm; at this size the memory card 20 is nearly as large as the lens cap 80. Some small lens caps such as the 40.5 mm shown in this example may be too small to accommodate some types of current memory cards on the inside of the lens cap. In this case a lens cap with storage device would be an appropriate solution and allow a card 20 to be stored on the cap 80. FIG. 8b shows the lens cap with an outside (front) view with a memory card 20 contained in the lens cap 80.

Advantages

From the description above, a number of advantages of some embodiments of my lens cap with storage device become evident:

(a) The lens cap with storage device provides an ideal place for a photographer to store an additional memory card creating backup for an integral part of the camera. In the case of memory card loss or malfunction of the primary memory card, the photographer simply removes a secondary memory card of the same type from the lens cap.

(b) Because the lens cap provides multiple functions acting as a traditional lens cap and a storage devices, there is nothing additional required that the photographer must manage.

(c) Because the lens cap is connected to the lens of a camera, it is immediately accessible. The photographer is no longer required to dig through pockets, bags, or other equipment in order to find additional memory cards.

(d) The lens cap with storage device optionally allows a photographer to store a conventional pre-moistened lens cleaning wipe. While on location this is an ideal solution to cleaning a dirty lens. Photographers often find themselves on location without a safe and convenient way to clean their lens or filter.

(e) The lens cap with storage device provides adequate room to affix a decal with the owner's personal contact information. If the camera is lost or stolen this information helps identify the original owner of the camera, increasing the odds that the camera can be safely returned.

(f) The lens cap provides the same safety functions as traditional lens caps protecting the lens from dirt, debris and damage while providing new novel features.

(g) Photographers may store items of their own preference in the lens cap storage device providing that the item is of appropriate size.

(h) Many photographers accidentally forget their primary memory card after transferring images to a discrete storage device. When this happens they can use the secondary memory card that is kept in the storage compartment in the lens cap.

(i) The operation, ergonomics and aesthetics of the camera remain unchanged because the inside of the lens cap can be utilized. This keeps the camera clean and streamlined with nothing to get in the way of the photographer.

(j) By attaching a small item to a larger item, it is more difficult to lose or misplace that item. The lens cap with storage device provides a dedicated place for items such as a memory cards.

CONCLUSION, RAMIFICATIONS, AND SCOPE

While my above description contains many specificities, these should not be construed as limitations on the scope, but rather as an exemplification of one or several embodiments thereof. Many other variations are possible. For example, it may be possible to manufacture a lens storage device where the retainer 30 is designed to be releasably connected to a generic lens cap 10 of a third party manufacturer. In this embodiment, only an adaptable retainer would be required in order to store an image storage device 20 in the lens cap 10.

Accordingly, the scope should be determined not by the embodiments illustrated but by the appended claims and their legal equivalents.

What is claimed is:

1. An image storage system, comprising:
a lens cap and a retainer, wherein male connectors are mounted on one of the retainer and the lens cap, and corresponding female connectors are mounted on an opposite one of the retainer and the lens cap, and
the male connectors are selectively inserted into the female connectors to releasably connect the retainer to the lens cap and define a compartment bounded by opposing surfaces on the retainer and the lens cap and by at least two sidewalls extending there between, and
further comprising an image storage device for storing a plurality of photographic images for subsequent download to a discrete storage device, wherein the image storage device is removably stored inside the enclosure, between the opposing surfaces and between the at least two sidewalls.

2. An image storage system, comprising:
a lens cap and a retainer, wherein the retainer is releasably connected to the lens cap to define a compartment bounded by opposing surfaces on the retainer and the lens cap and by at least two sidewalls extending there between, and
further comprising an image storage device for storing a plurality of photographic images for subsequent download to a discrete storage device, wherein the image storage device is removably stored inside the enclosure, between the opposing surfaces and between at least two sidewalls, and
the image storage device has a width, as measured in a direction perpendicular to the two sidewalls, of between 24 and 30 mm.

3. An image storage system, comprising:
a lens cap and a retainer, wherein the retainer is releasably connected to the lens cap to define a compartment bounded by opposing surfaces on the retainer and the lens cap and by at least two sidewalls extending there between, and
further comprising an image storage device for storing a plurality of photographic images for subsequent download to a discrete storage device,
wherein the image storage device is removably stored inside the enclosure, between the opposing surfaces and between the at least two sidewalls, and the image storage device has a thickness, as measured in a direction perpendicular to the opposing surfaces, of between 2 and 4 mm.

4. An image storage system, comprising:
a circular lens cap having a diameter and a circumference;
a retainer, wherein the retainer is releasably connected to the lens cap to define a compartment bounded by opposing surfaces on the retainer and the lens cap and by at least two sidewalls extending there between; and
an image storage device for storing a plurality of photographic images for subsequent download to a discrete storage device, wherein the image storage device is removably stored inside the enclosure and within the circumference, between the opposing surfaces and between the at least two sidewalls, and the image storage device has a maximum outside direction, as measured diagonally between two corners, of between 40 and 53 mm.

* * * * *